April 3, 1951  W. E. HAUT  2,547,463
CABINET COMPOSED OF INTERLOCKING SECTIONS
Filed May 23, 1947  4 Sheets-Sheet 1

*Inventor*
Walter E. Haut
By Clarence A. O'Brien
and Harvey B. Jacobson
*Attorneys*

April 3, 1951 W. E. HAUT 2,547,463
CABINET COMPOSED OF INTERLOCKING SECTIONS
Filed May 23, 1947 4 Sheets-Sheet 2
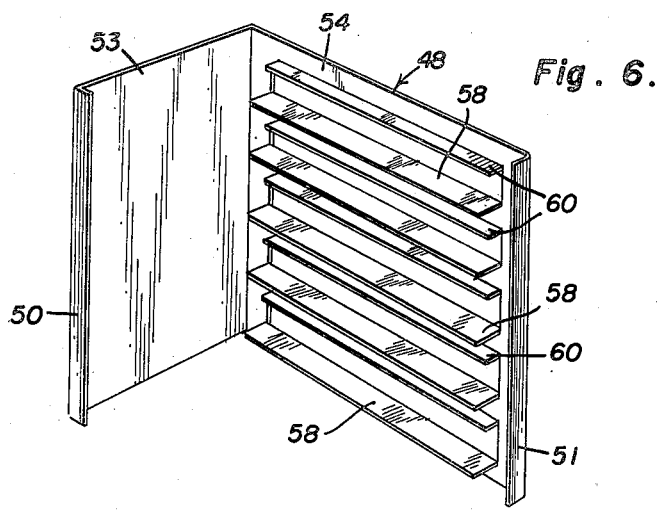
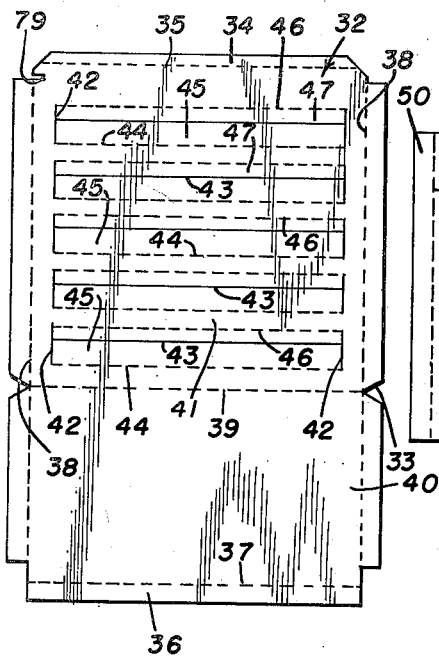
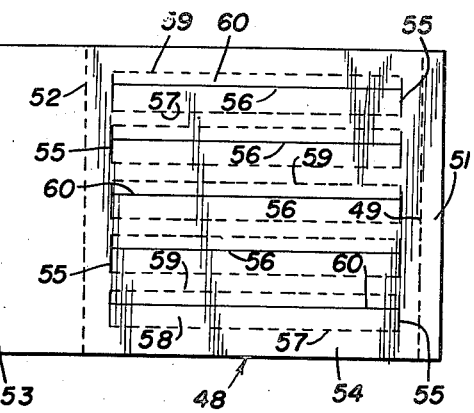
Inventor
Walter E. Haut
By Clarence A. O'Brien
and Harvey B. Jacobson
Attorneys April 3, 1951 W. E. HAUT 2,547,463
CABINET COMPOSED OF INTERLOCKING SECTIONS
Filed May 23, 1947 4 Sheets—Sheet 3

Inventor
Walter E. Haut

By Clarence A. O'Brien
and Harvey B. Jacobson
Attorneys

April 3, 1951  W. E. HAUT  2,547,463
CABINET COMPOSED OF INTERLOCKING SECTIONS
Filed May 23, 1947  4 Sheets-Sheet 4

Inventor
Walter E. Haut
By Clarence A. O'Brien
and Harvey B. Jacobson
Attorneys

Patented Apr. 3, 1951

2,547,463

UNITED STATES PATENT OFFICE 2,547,463

CABINET COMPOSED OF INTERLOCKING SECTIONS

Walter E. Haut, Chicago Heights, Ill., assignor of one-half to William C. Maltby, Chicago Heights, Ill.

Application May 23, 1947, Serial No. 749,925

5 Claims. (Cl. 312—350)

This invention relates to a cabinet and more particularly to a sheet metal structure.

The primary object of the invention is to facilitate the construction of a sheet metal cabinet which will be strong, durable, and in which drawers may be made to slide freely, and yet held in proper position therein.

The above and other objects may be attained by employing this invention which embodies among its features a box-like outer unit forming a top wall and a pair of spaced parallel side walls which extend perpendicularly from the top wall, a second unit forming a back wall and a drawer supporting panel which lies contiguous to one side wall within the box-like unit and a third unit forming a bottom wall and drawer supporting panel which lies contiguous with the other side wall within the box-like unit.

Other objects and features embody interlocking flanges on the various units which will serve to hold the parts properly assembled, and interlocking dimples in the bottom and certain flanges of the structure to serve not only in holding the parts in proper relation but also as feet upon which the cabinet may rest.

Still other features include spaced parallel drawer supporting flanges struck from the drawer supporting panels, and spaced parallel drawer guides struck from the drawer supporting panels and extending inwardly therefrom between the drawer supporting flanges.

Still other features include tongues which are adapted to be projected through slots in the front walls of the drawers, said tongues being formed as integral parts of a drawer pull and being adapted to be bent to lie contiguous with the inner face of the front wall of each drawer.

In the drawings:

Figure 5 is a plan view of the blank from which the unit illustrated in Figure 4 is produced;

Figure 6 is a perspective view of the unit comprising a drawer supporting panel and the back wall of the cabinet;

Figure 7 is a plan view of the blank from which the unit of Figure 6 is constructed;

Figure 1:
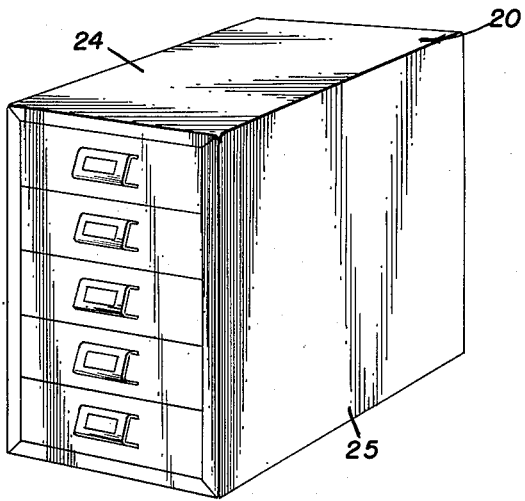
Figure 1 is a perspective view of a cabinet embodying the features of this invention.
Figure 2:
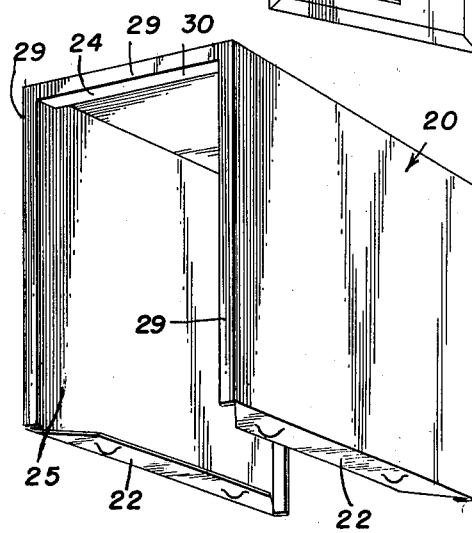
Figure 2 is a perspective view of the outer unit which forms a top wall and a pair of spaced parallel side walls.
Figure 4:
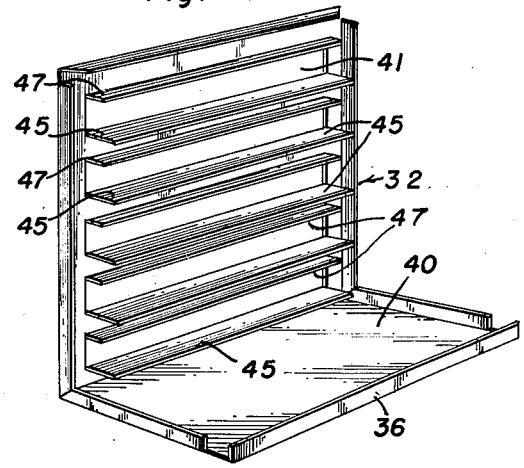
Figure 4 is a perspective view of the unit forming the bottom wall and a drawer supporting panel.
Figure 3:
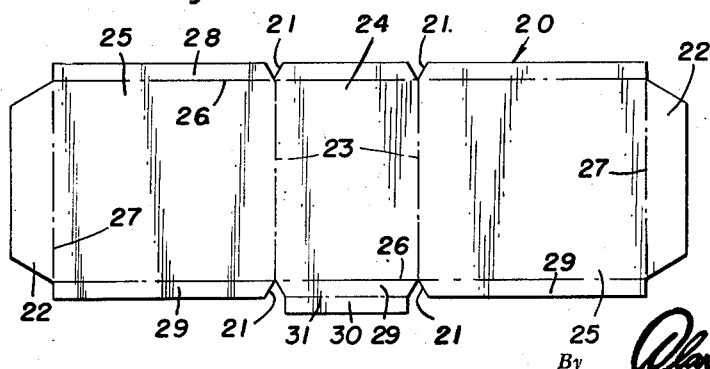
Figure 3 is a plan view of the blank from which the outer box-like unit is constructed.

Referring now to the drawings in detail, a cabinet as illustrated in Figure 1 comprises a box-like outer unit designated generally 20 formed of a single blank of metal having along opposite side edges V-shaped notches 21, and at opposite ends outwardly extending tongues 22. The blank is folded along fold lines 23 which extend between the apices of the V-shaped notches 21 to form a top wall 24 and a pair of spaced parallel side walls 25 which lie perpendicular to the plane of the top 24 as will be readily understood upon reference to Figure 2. Prior to bending the blank along the fold lines 23 it is bent along fold lines 26 and fold lines 27 so that the extension 22 when the blank is folded along the lines 23 will project toward one another as illustrated in Figure 2 to form supporting flanges for the bottom wall to be more fully hereinafter described. Folding the blank along the lines 26 will form on each panel or wall 24 and 25 at one end a back flange 28, and on the opposite ends of the walls front flanges 29. The flange 29 which is carried by the top wall 24 is provided with an extension 30 which is bent inwardly along a fold line 31 to form an inwardly extending tongue on the lower edge of the flange 29 to which it is attached.

In order to provide a drawer support within the box-like outer unit 20 along one side wall 25 I provide a unit designated generally 32 formed of a sheet metal blank having in opposite side edges V-shaped notches 33. Formed at one end of the blank is a tongue 34 which is adapted to be folded intermediate its ends along a fold line 35 to form a flange which lies perpendicular to the general plane of the blank. A tongue 36 extends outwardly from the opposite end of the blank and is adapted to be folded along a fold line 37 to form a flange which lies in a plane perpendicular with the general plane of the blank. Likewise the side portion of the blank lying beyond the fold lines 38 are adapted to be bent along said fold lines to lie in planes perpendicular to the general plane of the blank and the blank is adapted to be folded along a fold line 39 which extends transversely thereof between the notches 33 to form a bottom 40 and a drawer supporting panel 41. The panel 41 is provided adjacent opposite sides with longitudinally spaced incisions 42 which are joined by longitudinally spaced transversely extending incisions 43. Those portions of the blank lying between the lower ends of the incisions 42, and the incisions 43 are bent along fold lines 44 to lie perpendicular to the plane of the blank and form drawer supporting flanges 45, and those portions of the blank lying between the upper ends of the incisions 42 and the incisions 43 are bent along fold lines 46 to lie perpendicular to the plane of the blank and parallel with the flanges 45 to form guide flanges 47 for the drawers when the cabinet is assembled.

A second inner unit designated generally 48 comprises a blank folded along fold lines 49 adjacent opposite ends to form spaced parallel flanges 50 and 51 which lie perpendicular to the general plane of the blank. The blank is also folded intermediate its ends along a fold line 52 to form a back wall 53 and a drawer supporting panel 54. The panel 54 is formed adjacent opposite ends with transversely spaced elongated incisions 55, and transversely spaced longitudinal incisions 56 which extend between opposed incision 55 intermediate the ends thereof. The blank is then folded along fold lines 57 extending between the lowermost ends of the incision 55 to form drawer supporting flanges 58 and the blank is again bent along fold lines 59 extending between the opposite ends of incisions 55 to form outwardly extending drawer guide flanges 60 as will be readily understood upon reference to Figure 6.

Figure 8:
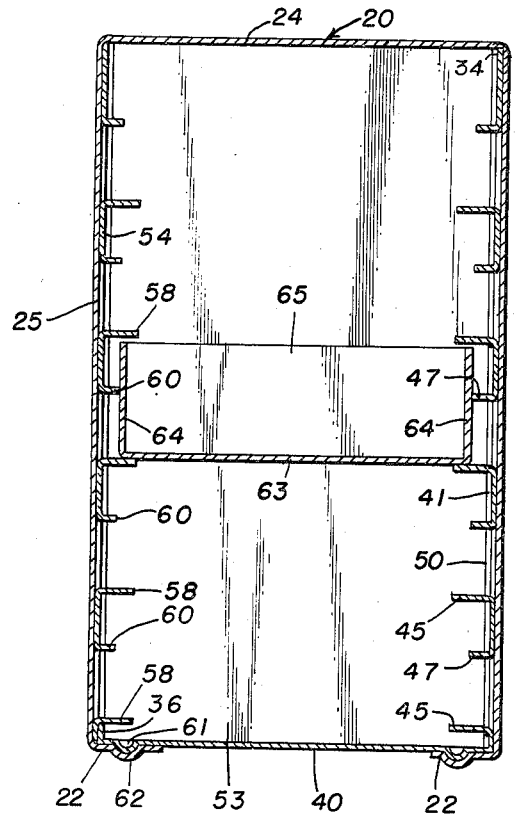
Figure 8 is a vertical sectional view through the assembled cabinet showing a drawer in place therein.
Figure 9:
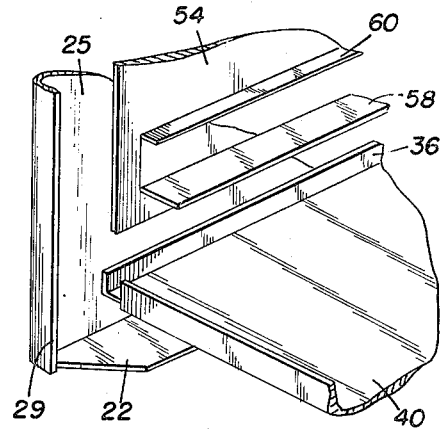
Figure 9 is a fragmentary perspective view illustrating the interfitting of the bottom wall with a side wall and the drawer supporting panel carried by the back wall.
Figure 12:
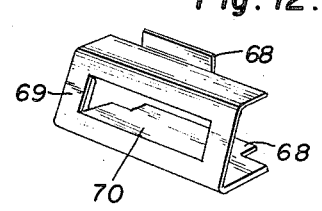
Figure 12 is a perspective view of a drawer pull embodying the features of this invention.
Figure 10:
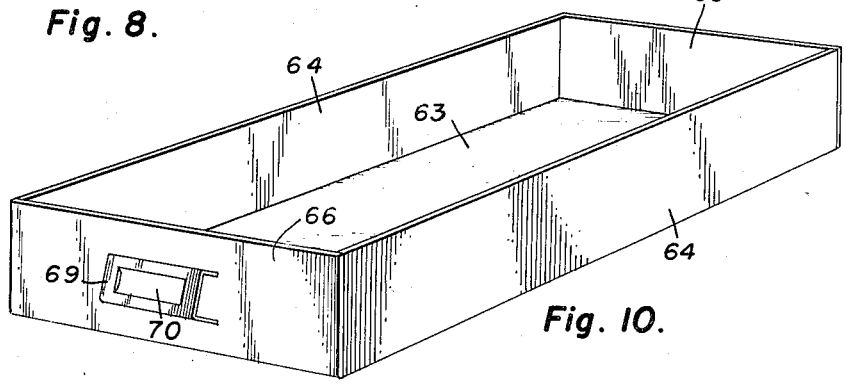
Figure 10 is a perspective view of one of the drawers.
Figure 11:
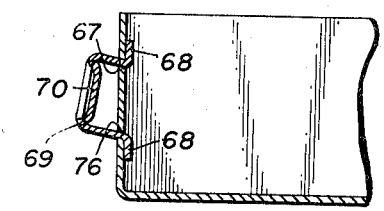
Figure 11 is a sectional view through the front end of one of the drawers showing the manner in which the drawer pull is attached to the drawer.

The structure so far described may be assembled as in Figure 8 with the panels 41 and 54 lying against the side walls 25 and the flanges 36 of the bottom wall 40 bearing against the inner face of the drawer support 54 while the flanges 50 of the back 53 bear against the inner face of the drawer support 41.

In order to effect an interlocking of the bottom wall 40 with the inturned flanges 22 of the outer unit 20 I provide the bottom wall 40 adjacent each corner with a dimple 61 which is adapted to be received in a dimple 62 formed near the end of each flange 22. It will thus be seen that when the parts are assembled as illustrated in Figure 8 the upper edge of the flange 36 bearing on the under face of the lowermost flange 58 of the drawer support 54 will serve securely to lock the dimples 61 in the dimples 62.

The drawers employed in the cabinet may be of any preferred construction though I find it convenient to form each from a sheet metal blank to provide a bottom 63 having integral extending upturned side walls 64 and an integral upstanding back wall 65 and an integral upstanding front wall 66. In its preferred form the upper edges of the side, back and front walls of each drawer lie in the same plane, and the front wall is formed with transversely extending spaced parallel slots 67 for the reception of the attaching tongues 68 formed on an outwardly projecting drawer pull 69 having a suitable label support 70. As illustrated in Figure 8 the drawer sliding on the drawer supporting flanges 58 will be guided between the guide flanges 60, and with the side and front and back walls of the drawer of a depth closely to fit between the drawer supporting flanges 58 it will be obvious that tilting of a drawer as it is withdrawn from the cabinet will be minimized.

Figure 13:
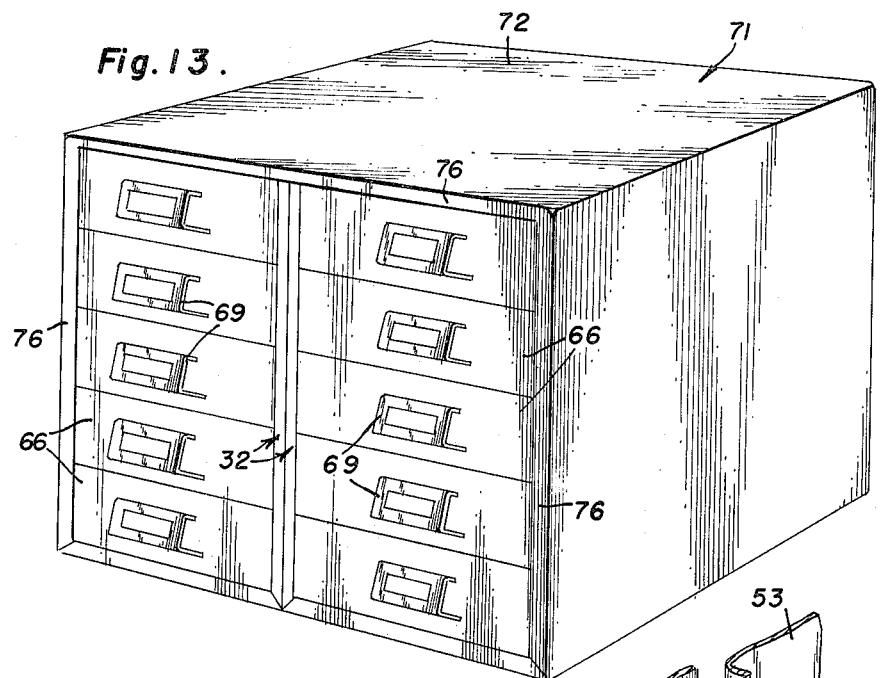
Figure 13 is a perspective view of a modified form of cabinet embodying the features of this invention.
Figure 14:
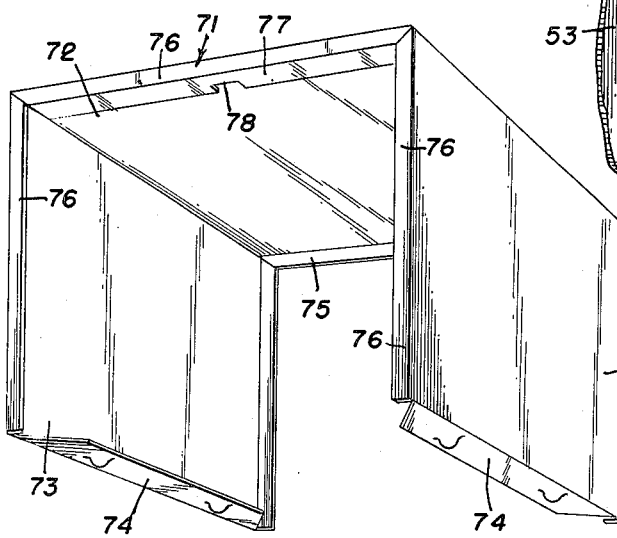
Figure 14 is a perspective view of the box-like outer unit of the cabinet illustrated in Figure 13.
Figure 15:
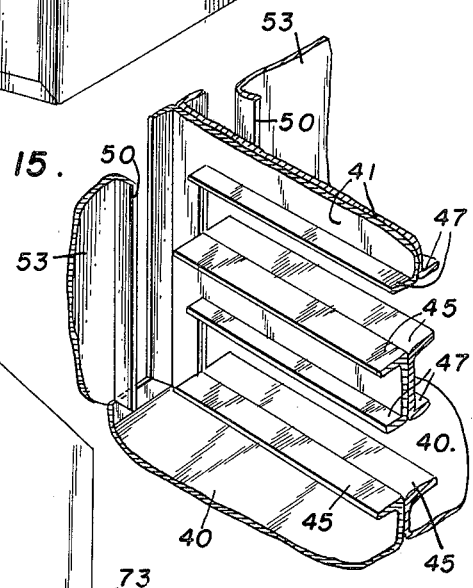
Figure 15 is a fragmentary perspective view illustrating the manner in which the centermost drawer supporting panels and bottom wall are joined to one another with the back wall ready to be slipped into place in the construction of a cabinet embodying the features of that illustrated in Figure 13.

In the modified form of the cabinet illustrated in Figure 13 the outer box-like unit designated generally 71 is constructed in substantially the same manner as the outer box-like structure 20 previously described and comprises a top 72 from opposite ends of which extend spaced parallel side walls 73 which lie perpendicular to the plane of the top and are provided at lower edges with inturned flanges 74 corresponding in all respects to the flanges 22 previously described. The top and side walls 73 are also provided with inwardly extending flanges 75 which lie along their rear edges and inwardly extending front flanges 76 which correspond with the flanges 29 previously mentioned. The flange 76 along the front edge of the top 72 is provided with an inturned flange 77 which is formed midway between opposite ends with a notch 78, and when this type of structure is employed the panel 41 of each inner unit 32 is provided at the front end of the tongue 34 with a notch 79. In assembling the parts, the units 32 are employed and the notches 78 and 79 interlock with the bottom walls 40 projecting in opposite directions and engaging opposite inturned flanges 74. It will be understood of course that in this type of construction the units 32 and 48 are made in right and left hand units so that the drawer supporting panels 54 will lie against the inner faces of the side walls 73 while the drawer supporting panels 41 will lie adjacent one another as illustrated in Figure 15.

From the foregoing it is obvious that a cabinet may be readily assembled from the units described without the necessity of employing an extraneous fastening means such as welds, bolts, or the like. Likewise the cabinet may be constructed to provide a single tier of drawers, or a double tier of drawers according to the requirements.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. A cabinet comprising an inverted substantially U-shaped box-like outer unit forming a top wall and a pair of spaced parallel side walls which extend perpendicularly from the top wall, a substantially L-shaped second unit forming a back wall which lies between the side walls and a drawer supporting panel which lies contiguous to one side wall within the box-like unit, and a substantially L-shaped third unit forming a bottom wall which lies between the side walls and a drawer supporting panel which lies in spaced parallel relation to the other drawer supporting panel and within the box-like unit.

2. A cabinet comprising an inverted substantially U-shaped box-like outer unit forming a top wall and a pair of spaced parallel side walls which extend perpendicularly from the top wall, a substantially L-shaped second unit forming a back wall which lies between the side walls and a drawer supporting panel which lies contiguous to one side wall within the box-like unit, and a substantially L-shaped third unit forming a bottom wall which lies between the side walls and a drawer supporting panel which lies contiguous with the other side wall and in spaced parallel relation to the other drawer supporting panel within the box-like unit.

3. A cabinet comprising an inverted substantially U-shaped box-like outer unit forming a top wall and a pair of spaced parallel side walls which extend perpendicularly from the top wall, a substantially L-shaped second unit forming a back wall which lies between the side walls and a drawer supporting panel which lies contiguous to one side wall within the box-like unit, and a substantially L-shaped third unit forming a bottom wall which lies between the side walls and a drawer supporting panel which lies contiguous with the other side wall and in spaced parallel relation to the other drawer supporting panel within the box-like unit and inwardly extending spaced parallel drawer supporting flanges carried by the drawer supporting panels.

4. A cabinet comprising a box-like outer unit forming a top wall and a pair of spaced parallel side walls which extend perpendicularly from the top wall, a pair of substantially L-shaped units within the box-like unit each having a horizontally disposed bottom section and a vertical drawer supporting panel, the drawer supporting panels lying contiguous and the bottom sections projecting in opposite directions in the same plane, a second pair of L-shaped units within the box-like unit each having a vertically disposed back wall section and a perpendicular drawer supporting panel which lies contiguous with a side wall of the box-like section and spaced parallel drawer supports carried by the drawer supporting panels.

5. A cabinet comprising a box-like outer unit forming a top wall and a pair of spaced parallel side walls which extend perpendicularly from the top wall, a pair of substantially L-shaped units within the box-like unit, each having a horizontally disposed bottom section and a vertical drawer supporting panel, the drawer supporting panels lying contiguous and the bottom section of each L-shaped unit projecting in opposite directions in the same plane, a second pair of L-shaped units within the box-like unit each having a vertically disposed back wall section and a perpendicular drawer supporting panel which lies contiguous with a side wall of the box-like section and spaced parallel drawer supports engageable with the undersides of the drawers and struck from and lying in planes perpendicular to the drawer supporting panels and spaced parallel drawer guides engageable with the sides of the drawers and struck from and lying in planes perpendicular to the drawer supporting panels between the drawer supports.

WALTER E. HAUT.

REFERENCES CITED

The following references are of record in the file of this patent:

UNITED STATES PATENTS

| Number | Name | Date |
| --- | --- | --- |
| 933,755 | Holland | Sept. 14, 1909 |
| 1,387,927 | Hoffman | Aug. 16, 1921 |
| 1,661,185 | Lindsey | Mar. 6, 1928 |
| 2,122,904 | Ambrosius | July 5, 1938 |
| 2,226,670 | Pratt | Dec. 31, 1940 |